United States Patent [19]

Hyer

[11] Patent Number: 4,904,434
[45] Date of Patent: Feb. 27, 1990

[54] METHOD OF FORMING AN IMPROVED WIPER BLADE

[75] Inventor: Michael L. Hyer, Weatherford, Tex.

[73] Assignee: JMK International, Inc., Fort Worth, Tex.

[21] Appl. No.: 263,915

[22] Filed: Oct. 28, 1988

[51] Int. Cl.⁴ ............................................. B29C 69/00
[52] U.S. Cl. ..................... 264/146; 264/148;
  264/151; 264/157; 264/177.1; 264/177.17;
  264/236; 264/297.5; 264/347; 425/291;
  425/307; 425/310
[58] Field of Search ............... 264/148, 149, 145, 146,
  264/147, 177.1, 236, 347, 177.17, 151, 157,
  297.5; 425/310, 313, 291, 307, 296, 114

[56] References Cited

U.S. PATENT DOCUMENTS

| | | | |
|---|---|---|---|
| 2,095,119 | 10/1937 | Beal | 264/147 |
| 2,096,347 | 10/1937 | Short | 425/113 |
| 2,137,887 | 11/1938 | Abbott | 264/177.17 |
| 2,149,002 | 2/1939 | Wermine | 425/114 |
| 2,218,751 | 10/1940 | Humphrey | 425/307 |
| 3,035,297 | 5/1962 | Overman et al. | |
| 3,092,866 | 4/1963 | Jennings et al. | |
| 3,744,947 | 7/1973 | Skobel | 264/149 |
| 3,784,533 | 1/1974 | Mach | 425/296 |
| 4,103,385 | 8/1978 | Porter | 264/148 |
| 4,552,713 | 11/1985 | Cavicchioli | 264/347 |

FOREIGN PATENT DOCUMENTS 58-145433  3/1983  Japan ................. 264/145

Primary Examiner—Jeffery Thurlow
Attorney, Agent, or Firm—Charles D. Gunter, Jr.

[57] ABSTRACT

A method is shown for forming a wiper blade in which a continuous length of elastomer is extruded through a die having a die opening shaped to produce a pair of wiper blades joined in edge-to-edge relation. The elastomer is scored in the mid-section thereof to produce a score line and then cured. The scored and cured elastomer is then separated into two separate lengths of wiper blade by dividing the length of continuous elastomer along the score line.

7 Claims, 1 Drawing Sheet

METHOD OF FORMING AN IMPROVED WIPER BLADE

BACKGROUND OF THE INVENTION

1. Field of the Invention

This invention relates in general to forming wiper blades for windshield wipers, and in particular to a method of forming an improved wiper blade utilizing an extrusion process.

2. Description of the Prior Art

Wiper blades, particularly those used in wiping vehicular windshields, are required to operate under a variety of adverse conditions. Such blades are typically formed of rubber, or rubber-like materials, and are forced into engagement with the vehicular windshield to clean dirt, dust and foreign matter as well as water from the windshield. U.S. Pat. No. 3,035,297, issued to Overman et al, May 22, 1962, is typical of the prior art manufacturing technique in which a wiper blade is molded in a mold in edge-to-edge relation, the dual blades being separated after curing in the mold by a single cut which simultaneously exposes a rubber edge on each blade.

A need exists for a wiper blade having improved edge quality which avoids pitting and inequalities in the edge surface of the blade.

A need also exists for an improved wiper blade which avoids streaking the windshield and which provides higher visibility during rain.

SUMMARY OF THE INVENTION

In the method of the invention, a continuous length of curable elastomer is extruded through a die having a die opening which is shaped to produce a pair of wiper blades joined at a mid-section thereof in edge-to-edge relation. In the next step of the method, the mid-section of the continuous length of extruded elastomer is scored to produce a score line. The continuous length of extruded elastomer is then cured and thereafter the length of continuous elastomer is separated into two separate lengths of wiper blade by dividing the length of continuous elastomer along the score line.

Preferably, the curable elastomer is a silicone rubber. The continuous length of silicone rubber is cured and then separated into two separate lengths of wiper blade while it is at a temperature above ambient by pulling the separate lengths apart along the score line. The separate lengths of wiper blade can then be cut into individual wiper-sized segments of any desired length.

Additional objects, features and advantages will be apparent in the written description which follows.

DETAILED DESCRIPTION OF THE INVENTION

Figure 1:
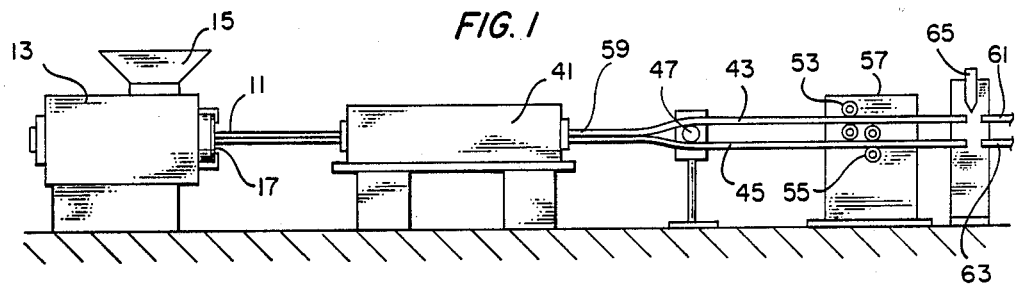
FIG. 1 is a simplified, schematic view of the overall process of the invention.

Referring to FIG. 1, the first step in the method of forming a wiper blade is to extrude a continuous length of a curable elastomer 11 from an extruder 13. The curable elastomer useful in practicing the present invention will include any curable materials capable of being formed by the method of the invention to the required shape. Silicone rubber compositions are preferred because of their stability and weatherability characteristics. A typical composition of the type known in the art will contain about 100 parts silicone polymer, about 40 parts filler, from about 0.5 to 2.0 parts vulcanizing catalyst, and 0 to 10 parts of other enhancement additives.

Typical silicone polymers will include dimethyl polysiloxane polymers with optional vinyl groups replacing methyl groups on the polymer chain. The vinyl level will be about 0 to 5 mole percent with the molecular weight of the polymer typically being above one million Typical fillers include fume silica, precipitated silica, ground quartz, calcium carbonate and iron oxide. Other conventional enhancement additives can be present as well, such as heat stabilizer, structure control additives, process aids and pigments.

The extruder 13 for the extrusion step is a conventional extruder having a hopper 15 which feeds into a hot cylinder. The heat softens the elastomer and it is forced by one or more spiral screws (not shown) out through a die 17 having a die orifice. The die orifice forms the cross-sectional shape of the continuous mass of elastomer as it passes through in conventional fashion. Extrusion processes of the type described are well known in the art and discussed, for example, in "Introduction To Plastics", L. K. Arnold, Iowa State University Press, 1968, pages 46–49.

Figure 2:
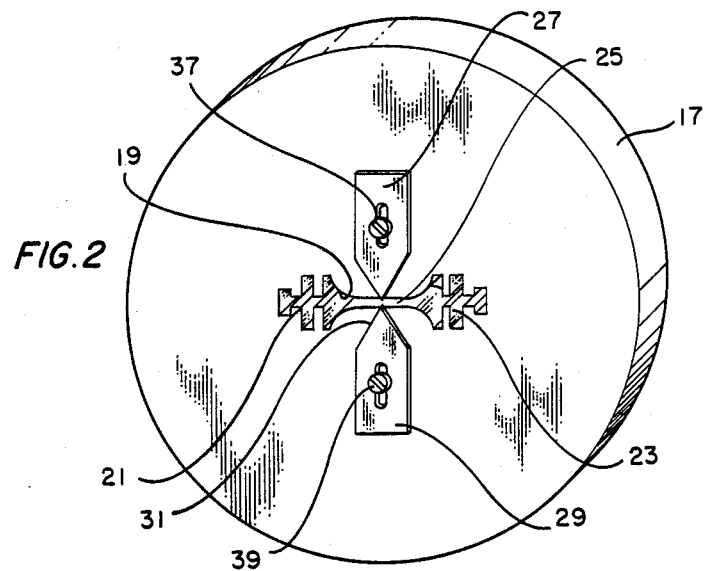
FIG. 2 is an isolated view of the extrusion die used in the extrusion step of the process of FIG. 1.

FIG. 2 is a detailed view of the special die 17 used in the practice of the method of the invention. The die 17 includes a die opening 19 which is shaped to produce a pair of wiper blades 21, 23 joined at a midsection 25 thereof in edge-to-edge relation.

The die 17 also includes an adjustable scoring mechanism, such as adjustable blades 27, 29. The blade tips 31 are not in contact but are spaced apart a preselected distance to score the continuous length of elastomer along the top and bottom surfaces 33, 35 thereof to a depth less than the thickness of the continuous length of elastomer. The blades 27, 29 can be adjusted by means of screws 37, 39 mounted on the die which are carried in vertical slots provided in the blades. The continuous length of extruded elastomer 11 which has been scored at the die 17 is then passed to a curing station. For instance, in the embodiment shown in FIG. 1, the curing station is a continuous vulcanizer 41 which is preferably a liquid medium such a eutechtic salt bath through which the elastomer is drawn. The salt bath is conventional and contains a liquid salt at a temperature from about 350° to 450° F. The viscosity of the salt at operating temperatures will be similar to water.

In order to be heat vulcanizable, the curable elastomer preferably contains a heat-activated catalyst such as dicumyl peroxide or 2:4 dichlorobenzoyl peroxide or mixtures thereof. It will be apparent that in addition to the preferred salt bath continuous vulcanizer 41 that any continuous vulcanizable method can be utilized. For instance, the vulcanizing step can as easily be performed by a hot air vulcanizing tunnel. Also, the continuous length of elastomer 11 could be cured without a heat activated catalyst, as by using infra red radiation or gamma radiation techniques familiar to those skilled in the art. It is only necessary that the previously formed and scored curable elastomer be cured such that the material can be divided and formed as subsequently described.

After curing, the continuous length of curable elastomer 11 is separated into two separate lengths of wiper blade 43, 45 by allowing one length 43 to travel over a fixed nip roller 47 while the second length 45 is pulled under the same roller 47. The beginning separation can be done by hand with the ends 49, 51 being engaged by roller pairs 53, 55 of a puller 57.

Preferably, the continuous length of scored elastomer 59 is separated by pulling over nip roller 47 while the elastomer is at an elevated temperature above ambient. Leaving the extruder 13, the curable elastomer 11 is typically at a temperature in the range from about 90°–100° F. The continuous vulcanizing step then typically raises the temperature to a higher elevation above ambient. For instance, in the case of a salt bath or hot air vulcanizing tunnel, the exiting material 59 would be at an elevated temperature on the order of 300°–450° F. The preferred temperature for the scored elastomer 59 at the separating roller 47 is in the range from about 100°–300° F., most preferably about 200° F. The decrease in temperature between the continuous vulcanizer 41 and the separating roller 47 can be achieved by exposure to the ambient atmosphere, pulling through a water trough with water at ambient temperature or by the use of air jets if necessary.

The separate continuous lengths of wiper blade 43, 45 are then cut transversely into individual wiper-sized segments 61, 63 by a conventional cutter 65.

Figure 3:
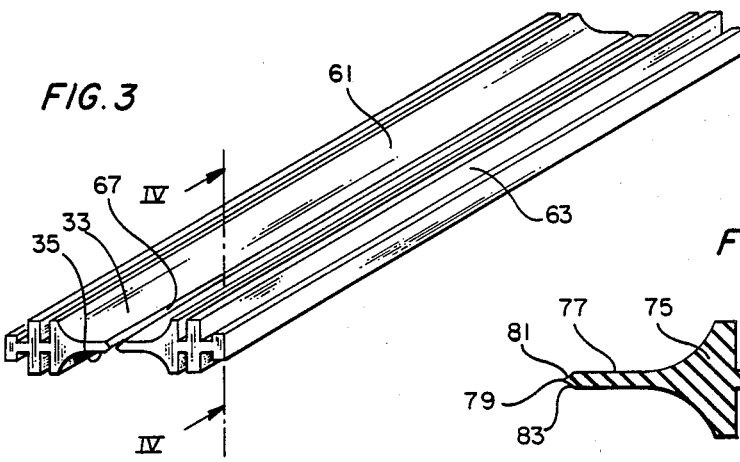
FIG. 3 is a perspective view of a pair of wiper blades formed by the process of FIG. 1.

FIG. 3 is a perspective view of a pair of wiper-sized segments 61, 63, the segments being separated by an opening 67 located at the approximate mid-section which formerly represented the score line prior to separation at the nip roller 47.

Figure 4:
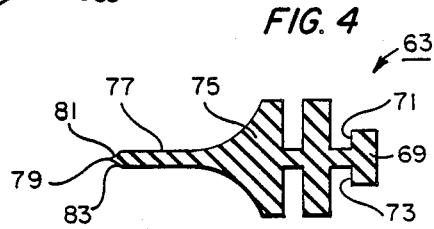
FIG. 4 is a cross-sectional view of a single wiper blade taken along lines IV—IV in FIG. 3.

As shown in FIG. 4, each blade 63 includes a relatively heavy base section 69 preferably provided with longitudinally extending notches or grooves 71, 73 at opposite sides thereof to facilitate attachment to the metal wiper carrier (not shown). The blade portion 75 extends outwardly from the base section 69 and tapers inwardly therefrom at each side thereof to form a thin outer extent 77. It will be noted that the thin outer extent terminates in a double beveled edge formed by intersecting faces 81, 83. The steps of scoring, then curing, followed by separating by pulling along the score line while the elastomer is at a temperature above ambient produces the unique double beveled edge which provides superior visibility in use.

An invention has been provided with several advantages. The wiper blade of the invention has improved edge quality for higher visibility in the rain and which avoids streaking of the windshield. The extrusion process allows a continuous length of blade to be formed at a lower cost than previous molding techniques. The unique double beveled edge which is produced on the wiper blade provides more even travel across the windshield for improved cleaning and visibility.

While the invention has been shown in only one of its forms it is not thus limited but is susceptible to various changes and modifications without departing from the spirit thereof.

I claim:

1. A method of forming a wiper blade, comprising the steps of:

extruding a continuous length of curable elastomer through a die having a die opening shaped to produce a pair of wiper blades joined at a mid-section thereof in edge-to-edge relation;

scoring the mid section of the continuous length of extruded elastomer prior to curing to produce a score line to facilitate the subsequent separation of the elastomer into a pair of wiper blades; then curing the continuous length of extruded elastomer; then separating the length of continuous elastomer into two separate lengths of wiper blade by pulling apart the length of continuous elastomer along the score line.

2. A method of forming a wiper blade, comprising the steps of:

extruding a continuous length of curable elastomer through a die having a die opening shaped to produce a pair of wiper blades joined at a mid-section thereof in edge-to-edge relation, said continuous length of curable elastomer having a top and bottom surfaces which define a thickness therebetween;

scoring the mid section of the continuous length of extruded elastomer as it leaves the extruded die and prior to curing by passing the continuous length of elastomer through a pair of transversely oriented blades to produce a score line to facilitate the subsequent separation of the elastomer into a pair of wiper blades;

thereafter, curing the continuous length of extruded elastomer; and then separating the length of continuous elastomer into two separate lengths of wiper blade by pulling the separate lengths apart along the score line.

3. The method of claim 2, wherein said blades are spaced apart a preselected distance to score the continuous length of elastomer along the top and bottom surfaces thereof to a depth less than the thickness of the continuous length of elastomer.

4. A method of forming a wiper blade, comprising the steps of:

extruding a continuous length of uncured silicone rubber through a die having a die opening shaped to produce a pair of wiper blades joined at a mid-section thereof in edge-to-edge relation, said continuous length of uncured silicone rubber having a top and bottom surfaces which define a thickness therebetween;

scoring the mid-section of the continuous length of uncured silicone rubber as it leaves the extruder die and prior to curing to produce a score line; then curing the continuous length of silicone rubber by heating to an elevated temperature above ambient; then separating the continuous length of silicone rubber into two separate lengths of wiper blade while it is at a temperature above ambient by pulling the separate lengths apart along the score line; and cutting the separate lengths of wiper blade into individual wiper-sized segments 5. The method of claim 4, wherein said transversely oriented blades are mounted on said extrusion die adjacent the extrusion opening therein.

6. The method of claim 5, wherein said extrusion die is provided as a plate having an inner face and an outer face and wherein said blades are adjustably mounted on the outer face of said die by means of adjustment screws which allow said blades to move in and out in a direction transverse to the longitudinal axis of said continuous length of silicone rubber being extruded.

7. The method of claim 6, wherein said uncured silicone rubber contains a vulcanizing catalyst and wherein said curing step in performed by passing said continuous length of uncured silicone rubber through a salt bath which actuates said vulcanizing catalyst.

* * * * *